US010185401B2

(12) United States Patent
Bhalla

(10) Patent No.: US 10,185,401 B2
(45) Date of Patent: Jan. 22, 2019

(54) DETERMINATION OF CURSOR POSITION ON REMOTE DISPLAY SCREEN BASED ON BLUETOOTH ANGLE OF ARRIVAL

(71) Applicant: Intel Corporation, Santa Clara, CA (US)

(72) Inventor: Himanshu Bhalla, Bengaluru (IN)

(73) Assignee: Intel Corporation, Santa Clara, CA (US)

(*) Notice: Subject to any disclaimer, the term of this patent is extended or adjusted under 35 U.S.C. 154(b) by 161 days.

(21) Appl. No.: 15/279,760

(22) Filed: Sep. 29, 2016

(65) Prior Publication Data

US 2018/0088673 A1    Mar. 29, 2018

(51) Int. Cl.
| | | |
|---|---|---|
| *G06F 3/038* | (2013.01) | |
| *G06F 1/16* | (2006.01) | |
| *G06F 3/01* | (2006.01) | |
| *G06F 3/03* | (2006.01) | |
| *G06F 3/0346* | (2013.01) | |
| *H04W 4/80* | (2018.01) | |
| *G06F 3/0484* | (2013.01) | |

(52) U.S. Cl.
CPC .............. *G06F 3/017* (2013.01); *G06F 1/163* (2013.01); *G06F 3/014* (2013.01); *G06F 3/0304* (2013.01); *G06F 3/038* (2013.01); *G06F 3/0325* (2013.01); *G06F 3/0346* (2013.01); *G06F 3/04845* (2013.01); *H04W 4/80* (2018.02); *G06F 2203/04806* (2013.01)

(58) Field of Classification Search
CPC ........... G06F 3/011; G06F 3/014; G06F 3/017
See application file for complete search history.

(56) References Cited

U.S. PATENT DOCUMENTS

| | | | | |
|---|---|---|---|---|
| 6,424,334 | B1* | 7/2002 | Zimmerman | A61B 5/1114 |
| | | | | 345/158 |
| 9,223,405 | B2* | 12/2015 | Ryoo | G06F 3/017 |
| 9,239,648 | B2* | 1/2016 | Smus | G06F 3/0416 |
| 9,377,854 | B2* | 6/2016 | Raffa | G06F 3/014 |
| 9,582,035 | B2* | 2/2017 | Connor | G06F 1/163 |
| 9,645,693 | B2* | 5/2017 | Smus | G06F 3/0416 |
| 9,880,632 | B2* | 1/2018 | Ataee | G06F 3/017 |
| 2003/0048312 | A1* | 3/2003 | Zimmerman | A61B 5/1114 |
| | | | | 715/863 |
| 2003/0214481 | A1 | 11/2003 | Xiong | |

(Continued)

FOREIGN PATENT DOCUMENTS

WO    2016-079774 A1    5/2016

OTHER PUBLICATIONS

Notification of Transmittal of the International Search Report and the Written Opinion of the International Searching Authority issued in PCT/US20178/054614 dated Jan. 16, 2018, 13 pages.

*Primary Examiner* — Patrick F Marinelli
(74) *Attorney, Agent, or Firm* — Jordan IP Law, LLC

(57) ABSTRACT

Systems, apparatuses and methods may determine the exact position of a cursor on the screen of a display device when the user is located at a predetermined distance from the screen of the display device are provided. The user of a wrist-wearable device may obtain a touch-screen experience when the user is positioned remotely from the display device by using a next generation Bluetooth-enabled display device and a next generation Bluetooth-enabled wrist-wearable device. The next generation Bluetooth version may be Bluetooth version 5.0.

20 Claims, 12 Drawing Sheets

(56) References Cited

U.S. PATENT DOCUMENTS

| | | | |
|---|---|---|---|
| 2011/0080339 A1* | 4/2011 | Sun | G06F 3/017 345/157 |
| 2011/0112793 A1* | 5/2011 | Diebold | A61B 5/11 702/141 |
| 2011/0199296 A1* | 8/2011 | Simpson | G06F 3/014 345/157 |
| 2011/0199303 A1* | 8/2011 | Simpson | G06F 3/011 345/158 |
| 2012/0133597 A1* | 5/2012 | Chen | G06F 3/044 345/173 |
| 2012/0235906 A1* | 9/2012 | Ryoo | G06F 3/017 345/158 |
| 2013/0027341 A1 | 1/2013 | Mastandrea | |
| 2013/0249793 A1 | 9/2013 | Yanning et al. | |
| 2014/0152558 A1* | 6/2014 | Salter | G06F 3/013 345/157 |
| 2014/0267024 A1* | 9/2014 | Keller | G06F 3/017 345/156 |
| 2015/0062086 A1* | 3/2015 | Nattukallingal | G06F 3/016 345/175 |
| 2015/0220154 A1* | 8/2015 | Midholt | G06F 3/017 345/156 |
| 2015/0227245 A1* | 8/2015 | Inagaki | G06F 3/0412 345/173 |
| 2015/0261373 A1* | 9/2015 | Smus | G06F 3/0416 345/174 |
| 2015/0277557 A1* | 10/2015 | Raffa | G06F 3/014 345/156 |
| 2015/0309535 A1* | 10/2015 | Connor | G06F 1/163 361/679.03 |
| 2015/0370333 A1* | 12/2015 | Ataee | G06F 3/017 345/156 |
| 2016/0011660 A1 | 1/2016 | Wieder | |
| 2016/0098125 A1* | 4/2016 | Smus | G06F 3/0416 345/174 |
| 2016/0299526 A1* | 10/2016 | Inagaki | G02F 1/133305 |
| 2017/0038857 A1* | 2/2017 | Moran | G06F 3/0482 |
| 2017/0052589 A1* | 2/2017 | Raffa | G06F 3/014 |
| 2017/0308165 A1* | 10/2017 | Erivantcev | G06F 3/014 |
| 2017/0315620 A1* | 11/2017 | Johri | G06F 3/017 |
| 2018/0011545 A1* | 1/2018 | Stafford | G06F 3/017 |
| 2018/0067562 A1* | 3/2018 | Saitou | G06F 3/011 |
| 2018/0078183 A1* | 3/2018 | Lor | A61B 5/1122 |
| 2018/0088673 A1* | 3/2018 | Bhalla | G06F 3/017 |

* cited by examiner

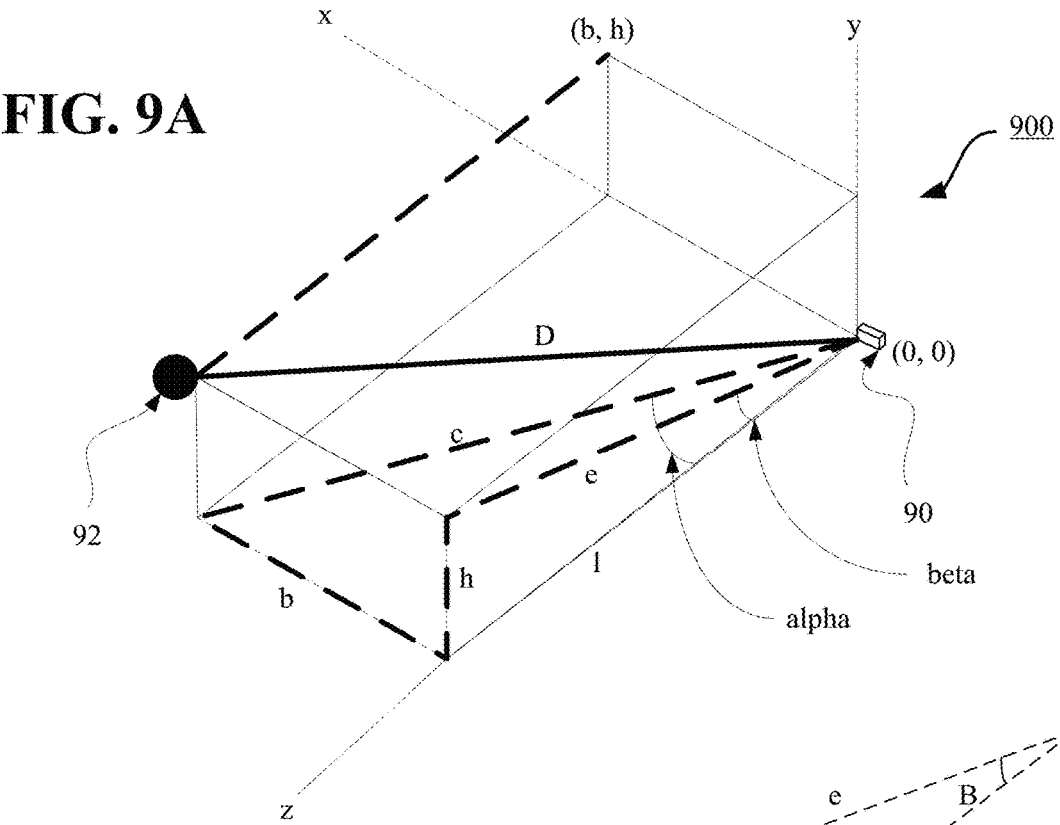
FIG. 9A
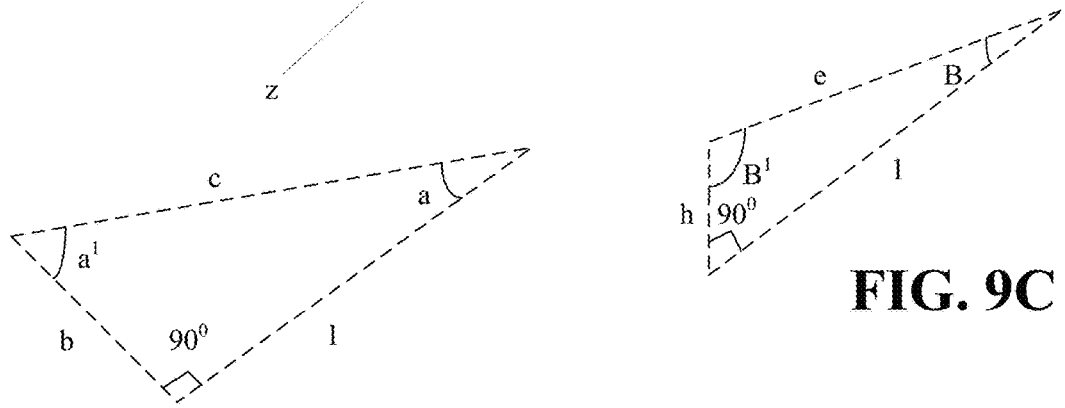
FIG. 9B
FIG. 9C
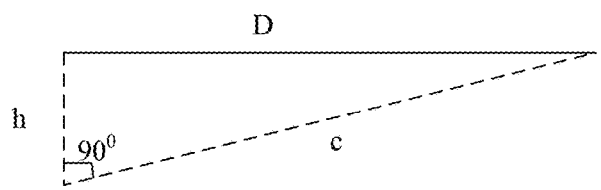
FIG. 9D

DETERMINATION OF CURSOR POSITION ON REMOTE DISPLAY SCREEN BASED ON BLUETOOTH ANGLE OF ARRIVAL

BACKGROUND

Technical Field

Embodiments generally relate to display technology. More particularly, embodiments relate to the determination of the exact position of a cursor on the screen of a display device when the user is located at a predetermined distance from the screen of the display device.

Discussion

Wearable devices may incorporate technology that allows the devices to communicate or exchange data with connected devices without requiring user intervention. Technology exists that allows pointers or cursors positioned on display screens to be controlled by remote pointing devices such as a mouse, Wii® remote control or MYO armband. Although these pointing devices may adequately control the cursors from a remote distance, the pointers work independently of the orientation of the screen, and regardless of whether the pointer is pointing directly to the display screen.

Additionally, existing wearable devices may use camera(s) to track the user's hands and fingers to determine the orientation of the wearable device with respect to the display screen. These cameras are expensive, however, since they have both day and night vision, and are not portable since they involve complex setup for proper functioning.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 9A-9D illustrate a cuboid representation of an example of tracking a wearable device according to an embodiment;

DETAILED DESCRIPTION OF EXEMPLARY EMBODIMENTS

In accordance with embodiments, a method, apparatus, and system are provided to determine the position of a screen pointer or cursor on a remote display screen based on wireless (e.g., Bluetooth/BT) Angle of Arrival calculations.

Figure 1:
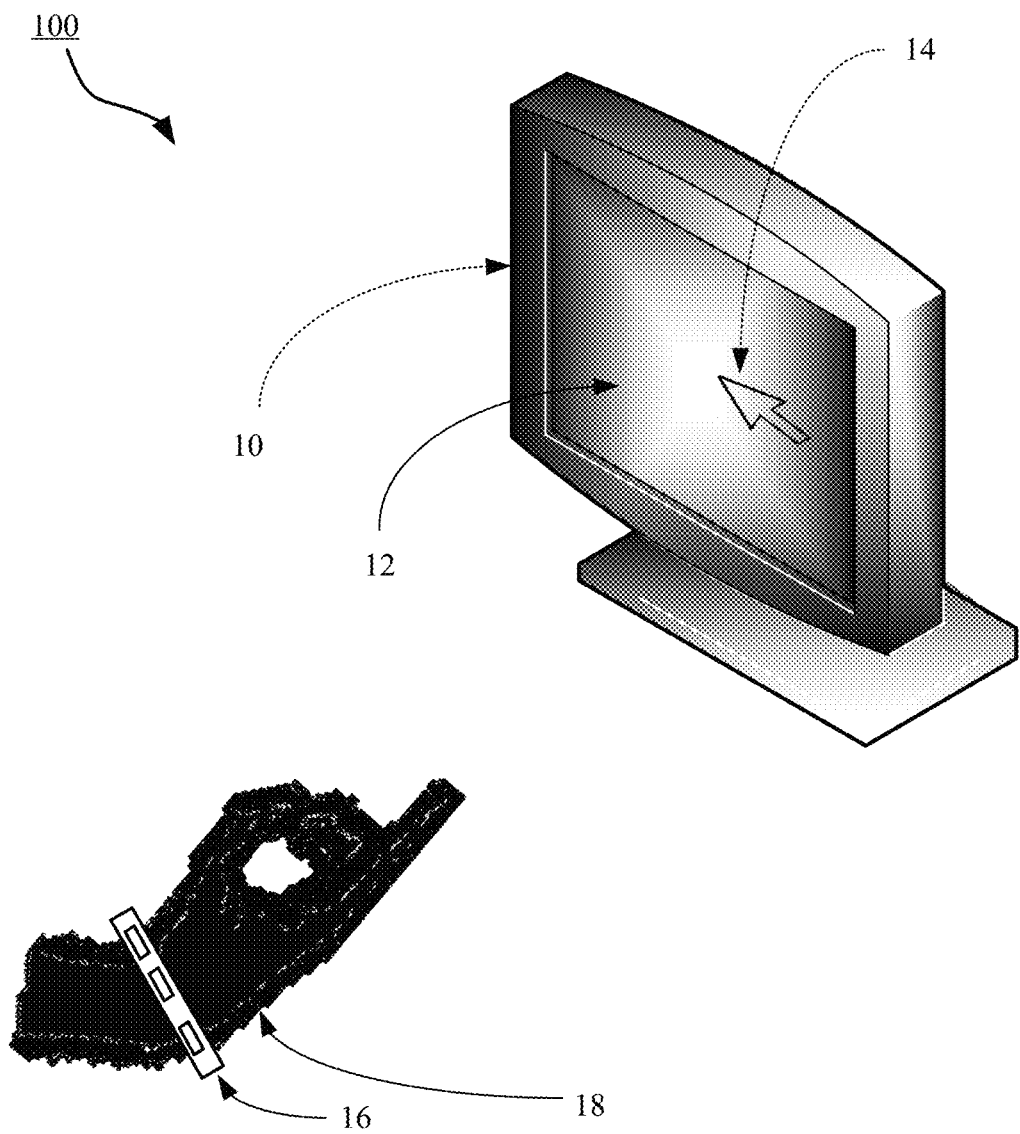
FIG. 1 is an illustration of an example of a screen pointer determination system according to an embodiment.

Turning now to FIG. 1, an environment 100 is shown, in which the exact position of a cursor 14 positioned on the screen 12 of a display device 10 is determined based on a determined orientation of the screen 12 of the display device 10, an orientation of the wrist 18 of a remote user, and an orientation of a wearable device 16 connected to the wrist 18 of the user. The environment 100 enables a user who is located at a distance from the screen 12 of the display device 10 to achieve a remote touch screen experience when engaging the display device 10.

The environment 100 may support a next generation Bluetooth (BT) version 5.0 enabled screen and a next generation BT version 5.0 enabled wearable device. BT version 5.0 allows the maximum range between two BT-enabled devices to be increased, and increases the speed and data processing capacity of BT connections. BT version 5.0 may also provide spatial information of the wearable device 16 based on the Angle of Arrival of radio frequency (RF) signals. The use of BT version 5.0 is only exemplary, and the environment 10 may utilize any BT or other wireless version.

The screen 12 of the display device 10 may be enabled with Bluetooth in various manners. For example, the screen 12 of the display device 10 may be enabled with a built-in BT chipset, an externally attached BT Universal Serial Bus (USB) dongle, a compute stick, a real-sense type BT clip-on device, or game-console dongles. These BT devices, however, are only exemplary, and the screen 12 may be enabled with any other type of BT device.

Figure 2:
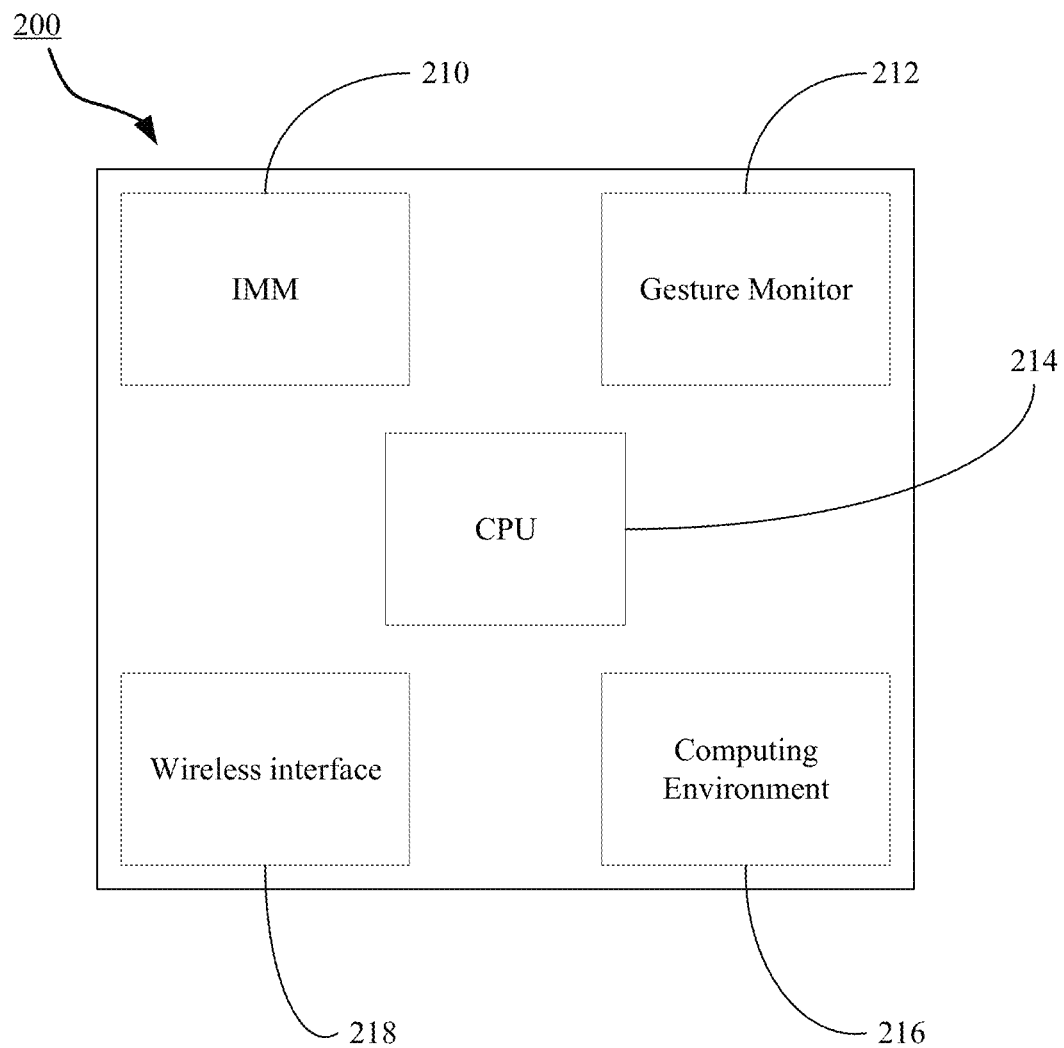
FIG. 2 is a block diagram of an example of a wearable device according to an embodiment.

Turning now to FIG. 2, a wearable device 200 is illustrated. The wearable device 200 includes an inertial measurement monitor (IMM) 210, a gesture monitor 212, a processor 214, a computing environment 216, and a wireless interface 218.

The IMM 210 may capture an orientation of the wrist 18 (FIG. 1) of the user, an orientation of the wearable apparatus 16 (FIG. 1), and an orientation of the screen 12 (FIG. 1) of the external wireless-enabled display device 10 (FIG. 1). The IMM 210 may utilize three-dimensional accelerometer, digital compass technology, and gyroscope technology.

The gesture monitor 212 may comprise a sensor or a camera, and may use the sensor or camera to capture specific movements of fingers and thumbs of the user. The captured movements of the fingers and thumbs of the user may be translated to actionable operations such as zoom, swipe, slide, click, etc.

The information captured by the IMM 210 and the gesture monitor 212 are transmitted to the computing environment 216 based on operations of the CPU 214. The computing environment 216 uses algorithms to perform calculations to show a representation of the precise location where the user is currently pointing on the screen 12 (FIG. 1), and controls the pointer 14 (FIG. 1) based on the determined calculations (discussed below).

The captured information may be relayed to the wireless interface 218, and transmitted, via the wireless interface 218, to the BT interface of the screen 12 (FIG. 1) of the display device 10 (FIG. 1).

The calculations to determine the exact position of the cursor 14 (FIG. 1) may be based on (1) an identification of finger/thumb movements of the user; (2) the orientation of the wrist of the user in space; (3) the wrist orientation of the user with respect to the BT chip of the screen 12 (FIG. 1), which includes determining a distance between the wearable device 16 (FIG. 1) and the screen 12 (FIG. 1), and an angle between the wearable device 16 (FIG. 1) and the screen 12 (FIG. 1); (4) an identification of the position of the BT chip with respect to the screen 12 (FIG. 1), and (5) the orientation and size of the screen 12 (FIG. 1). It is to be noted that the calculations may be based on the actual position of the BT chip, or may be based on the position of antennas associated with the BT chip.

The distance between the wearable device 16 (FIG. 1) and the BT chip on the screen 12 (FIG. 1) may be determined on the basis of contextual information provided by BT technology. The contextual information may include received signal strength indicator (RSSI), which is a measurement of the power present in a received radio signal, and transmission (Tx) power.

The angle between the wearable device 16 (FIG. 1) and the screen 12 (FIG. 1) may be determined using Angle of Arrival of RF signal measurements. Using this information, the angle at which the wearable device (and thereby the hand/arm of the user) is oriented with reference to the screen may be determined. This concept may be illustrated in FIGS. 3A and 3B.

Figure 3A:
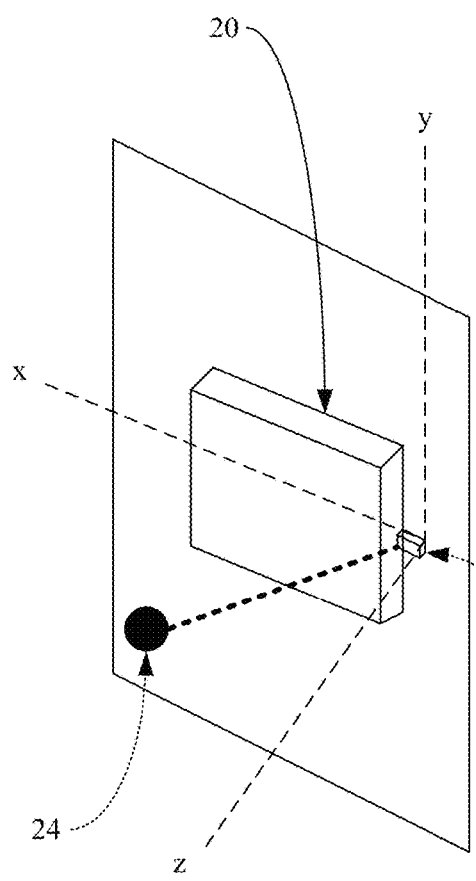
FIGS. 3A and 3B illustrate an example determination of an orientation of a wearable device with respect to a display screen according to an embodiment.
Figure 3B:
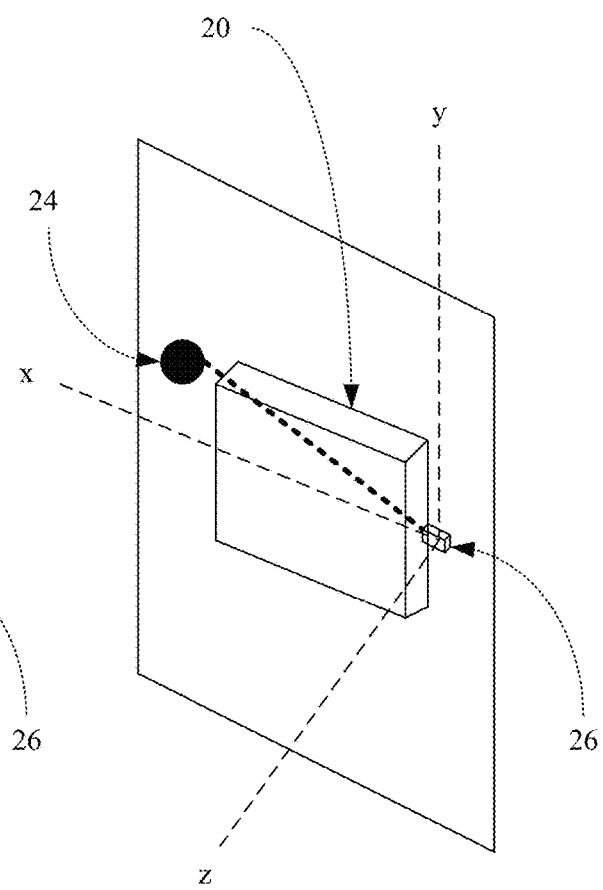

FIGS. 3A and 3B illustrate an example of determining an orientation of a wearable device with respect to a display screen according to an embodiment. In FIG. 3A, the wearable device 24 is oriented at the approximate center of the screen 20. The angle at which the wearable device 24 is oriented with regard to the BT chip 26 of the screen 20 may be determined based on a vertical angle and a horizontal angle between the respective BT devices of the wearable device 24 and the screen 20.

In FIG. 3B, the wearable device 24 is illustrated as being at a location that is approximately at the top of the screen 20. The angle at which the wearable device 24 is oriented with regard to the BT chip 26 of the screen 20 may be determined based on a vertical angle and a horizontal angle between the respective BT devices of the wearable device 24 and the screen 20.

Figure 4:
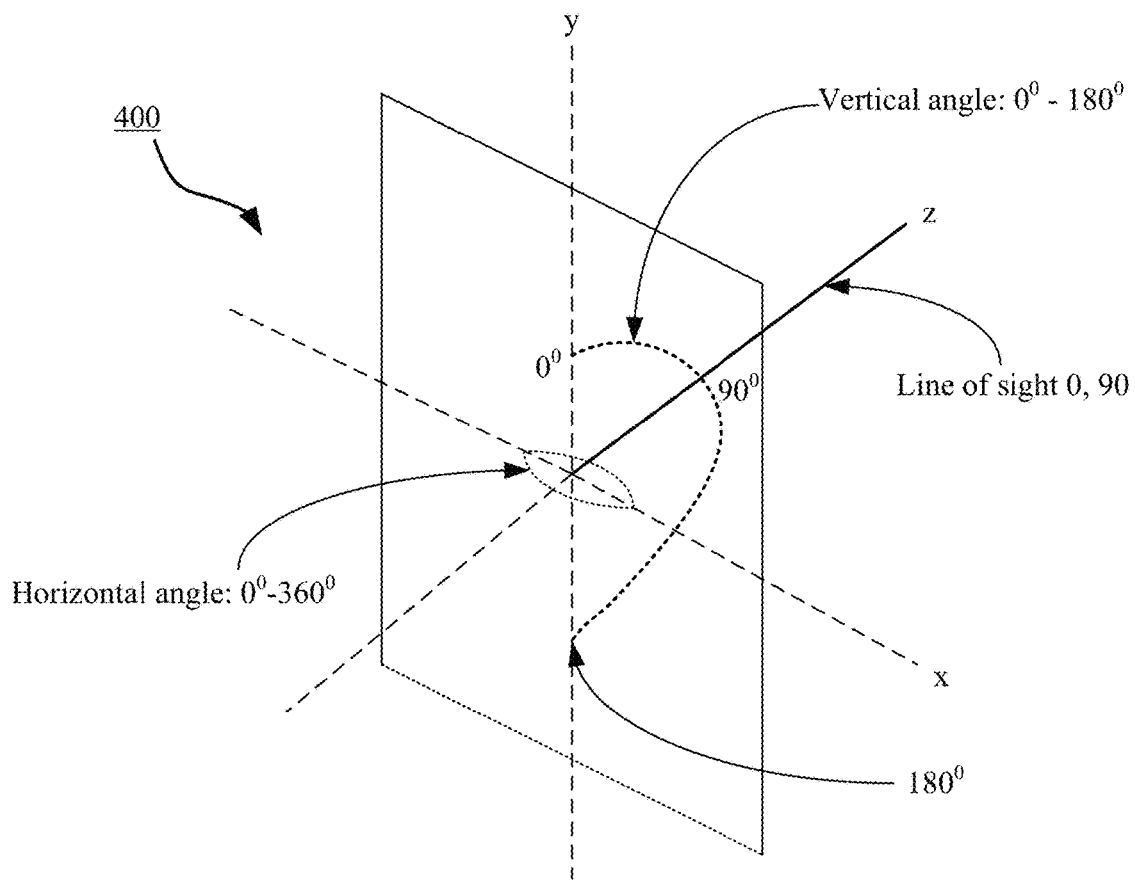
FIG. 4 illustrates an example measurement of an Angle of Arrival according to an embodiment.

FIG. 4 illustrates the measurement of the Angle of Arrival according to an embodiment. In FIG. 4, the Angle of Arrival may be measured based on the horizontal angle and the vertical angle between the wearable device and the screen.

In order to determine the exact position of a pointer on the screen, the position of the BT chip 26 on the screen 20 (FIGS. 3A and 3B) has to be determined. The BT chip may be set as the origin, and its exact position in the three-dimensional (3D) coordinate system may be determined. For a built-in BT chip, the position of the BT chip with respect to the screen may be determined by looking at the schematics of the screen. For external BT chip adapters, (for example, USB-Dongle/HDMI-Compute Stick), the position of the BT chip may be obtained by recognizing an input port of the screen 20 into which the BT chip is connected. The position of the port to which the BT chip is connected may be provided from the manufacturer.

On the other hand, for clip-on type BT devices, (for example, RealSense integrated with BT Version 5.0), the user may be prompted to provide the exact position of the placement of the clip-on type BT device. Alternately, various calibration methods may be used to determine the orientation of the clip-on type BT device with respect to the screen.

Figure 5A:
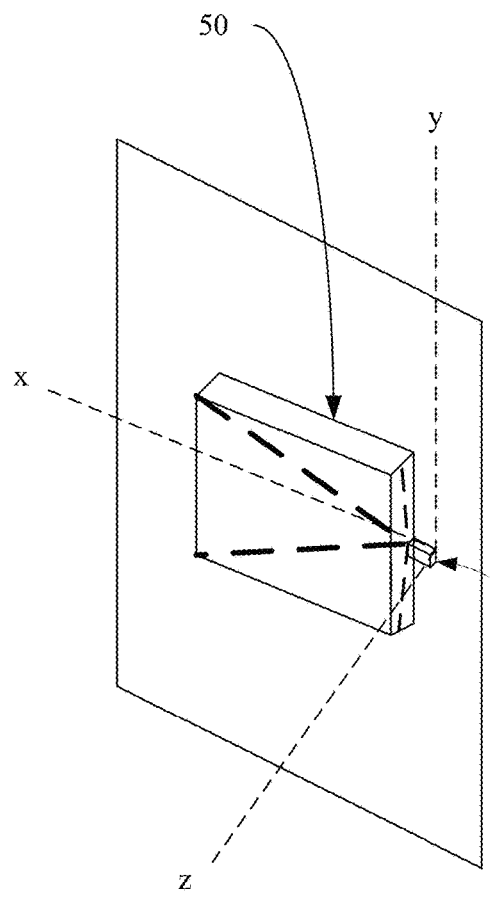
FIGS. 5A and 5B illustrate another example determination of an orientation of a wearable device with respect to a display screen according to an embodiment.
Figure 5B:
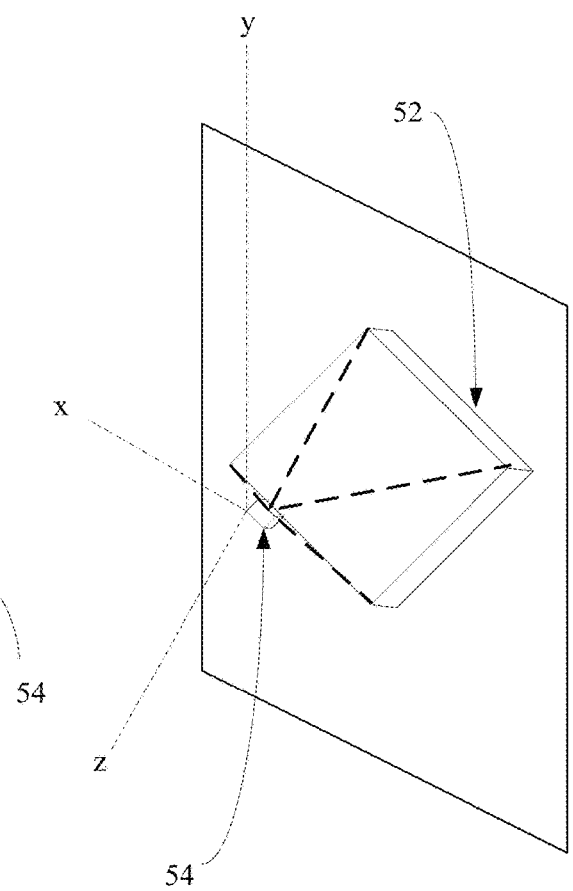

Turning now to FIGS. 5A and 5B, the determination of the screen size and orientation of the screen is illustrated. The size of the screen may be known and accurately documented by the manufacturer of the display device. The size and orientation of the screen may facilitate a determination of the exact position of the area on the screen where the user is pointing.

In FIG. 5A, the BT chip 54 is illustrated as being connected to the side of the screen 50. The orientation of the screen 50 is parallel to the x-axis, the y-axis, and the z-axis.

In FIG. 5B, the BT chip 54 is illustrated as being connected to the bottom of the screen 52. In this case, the screen is slightly tilted with respect to the x-axis, the y-axis, and the z-axis.

Figure 6:
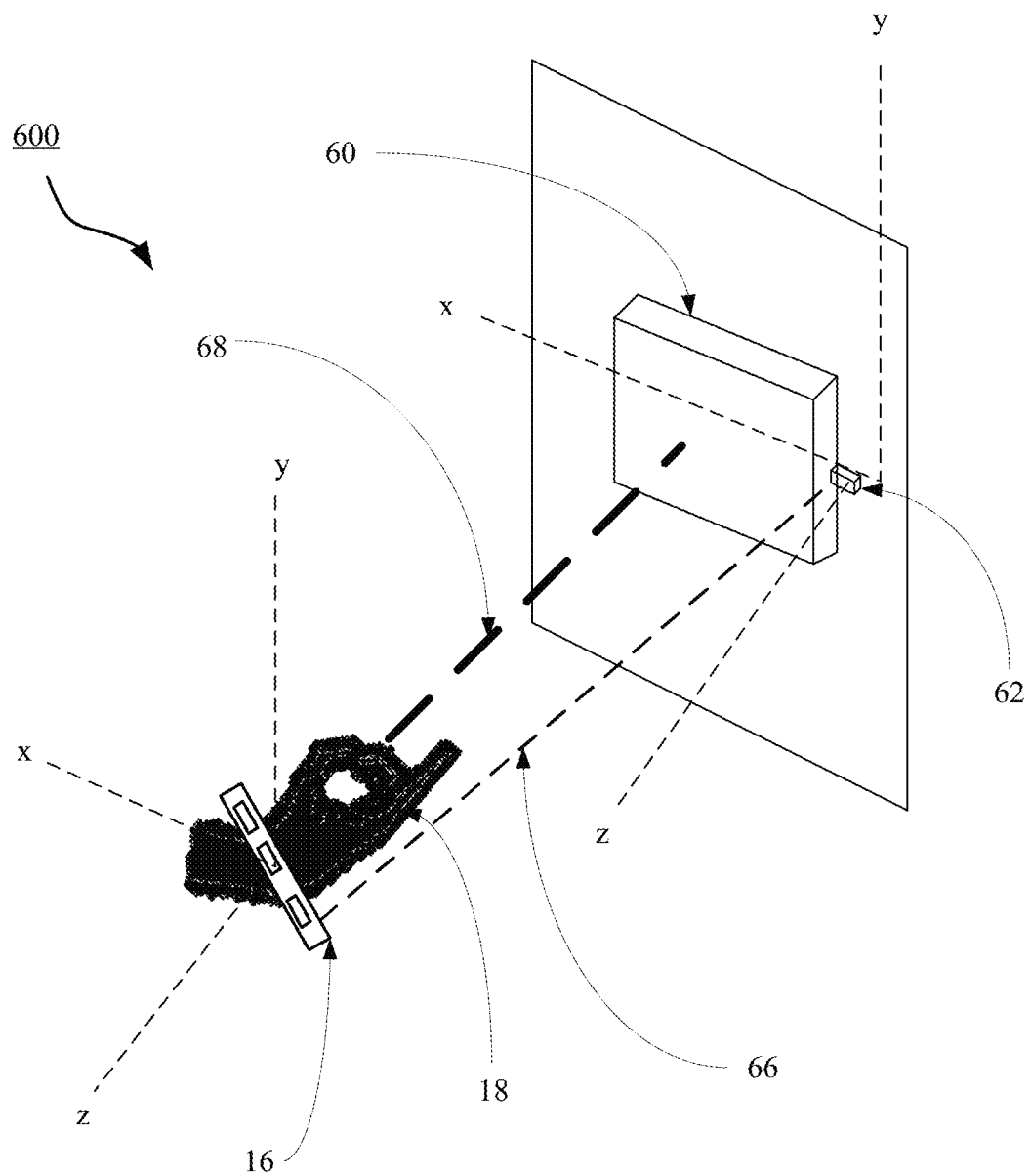
FIG. 6 illustrates an example of the performance of a user operation on a remote display screen according to an embodiment.

Turning now to FIG. 6, a scenario in which a user performs a zoom operation at a specific area of the screen 60 is illustrated. The orientation of the BT chip 62 with respect to the screen is determined. For example, a determination is made whether the BT chip 62 is connected to a side, a top, or a bottom area of the screen 60. As discussed above, the location of the BT chip 62 may be determined by examining the schematics of the screen (for built-in BT chips), and by determining an input port of the screen 60 into which the BT chip is connected (for external BT chips).

Next, the orientation of the screen with respect to space may be determined based on calculations made by the IMM of the wearable device 16.

Next, the orientation and distance 66 of the BT chip 62 with respect to wearable device 16 is calculated based on BT Angle of Arrive calculations and received signal strength indicator (RSSI) and transmission (Tx) power calculations.

The orientation of the wearable device with respect to space may then be determined based on IMM calculations.

After the orientation of the BT chip 62, the orientation of the screen 60, the angle and distance between the BT chip 62 and the wearable device 16, and the orientation of the wearable 16 are determined, an exact position where the user is pointing in relation to the screen 60 may be ascertained, and a zoom operation, or any other type of user operation 68 may be performed by the user.

Figure 7:
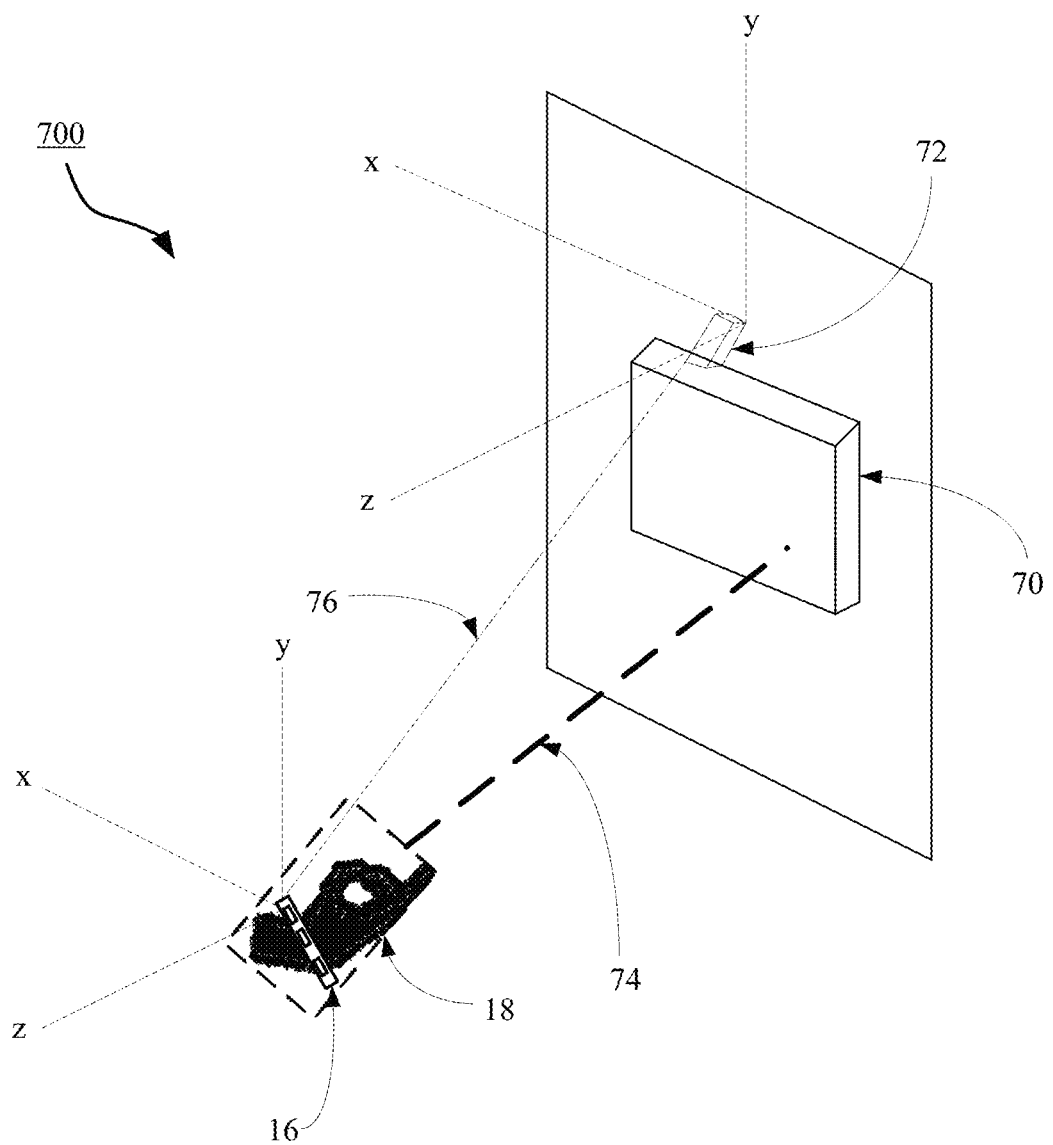
FIG. 7 illustrates an example of the performance of a user operation on a remote display screen according to another embodiment.

Turning now to FIG. 7, a scenario 700 where a platform 72 (e.g., enabled with REALSENSE camera technology) integrated with BT version 5.0 is connected to a top portion of the screen 70, and the user performs operations such as zoom in/out operations with respect to the screen 70.

First, the orientation of the platform 72 with respect to the screen is determined. The orientation of the screen may then be determined. As discussed above, the orientation of the screen with respect to space may be determined based on calculations made by the IMM of the wearable device 16.

The orientation of the platform 72, and the distance 76 between the platform 72 and the wearable device 16 is determined. The orientation of the platform 72, and the distance 76 between the platform 72 and the wearable device 16 may be determined based on BT Angle of Arrive calculations and received signal strength indicator (RSSI) and transmission (Tx) power calculations.

Next, the orientation of the wearable device 16 with respect to space may be determined based on IMM calculations. An exact position where the user is pointing in relation to the screen 70 may be ascertained, and a zoom operation, or any other type of user operation 74 may be performed by the user.

Figure 8:
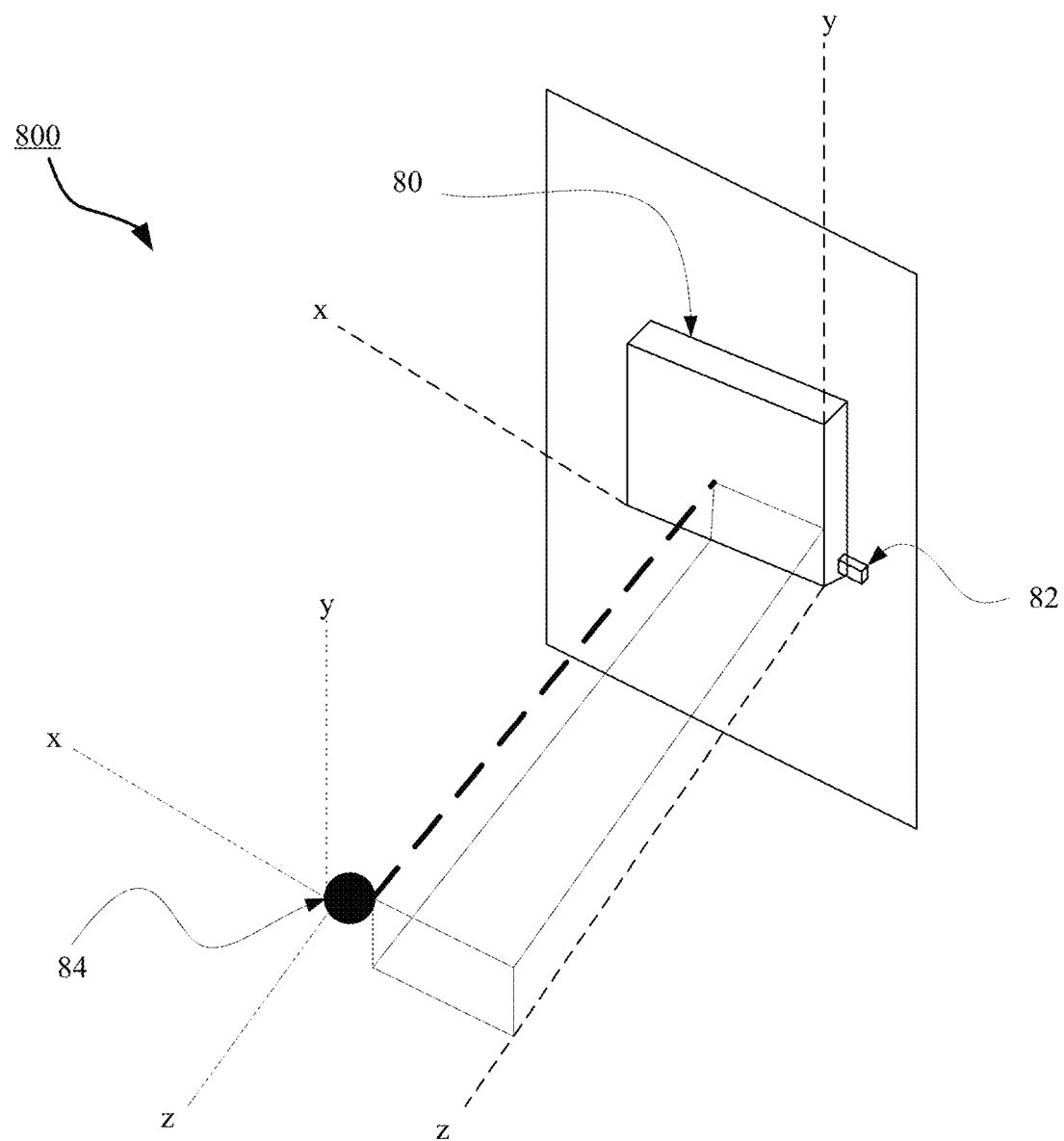
FIG. 8 illustrates an example of tracking a wearable device according to an embodiment.
Figure 10:
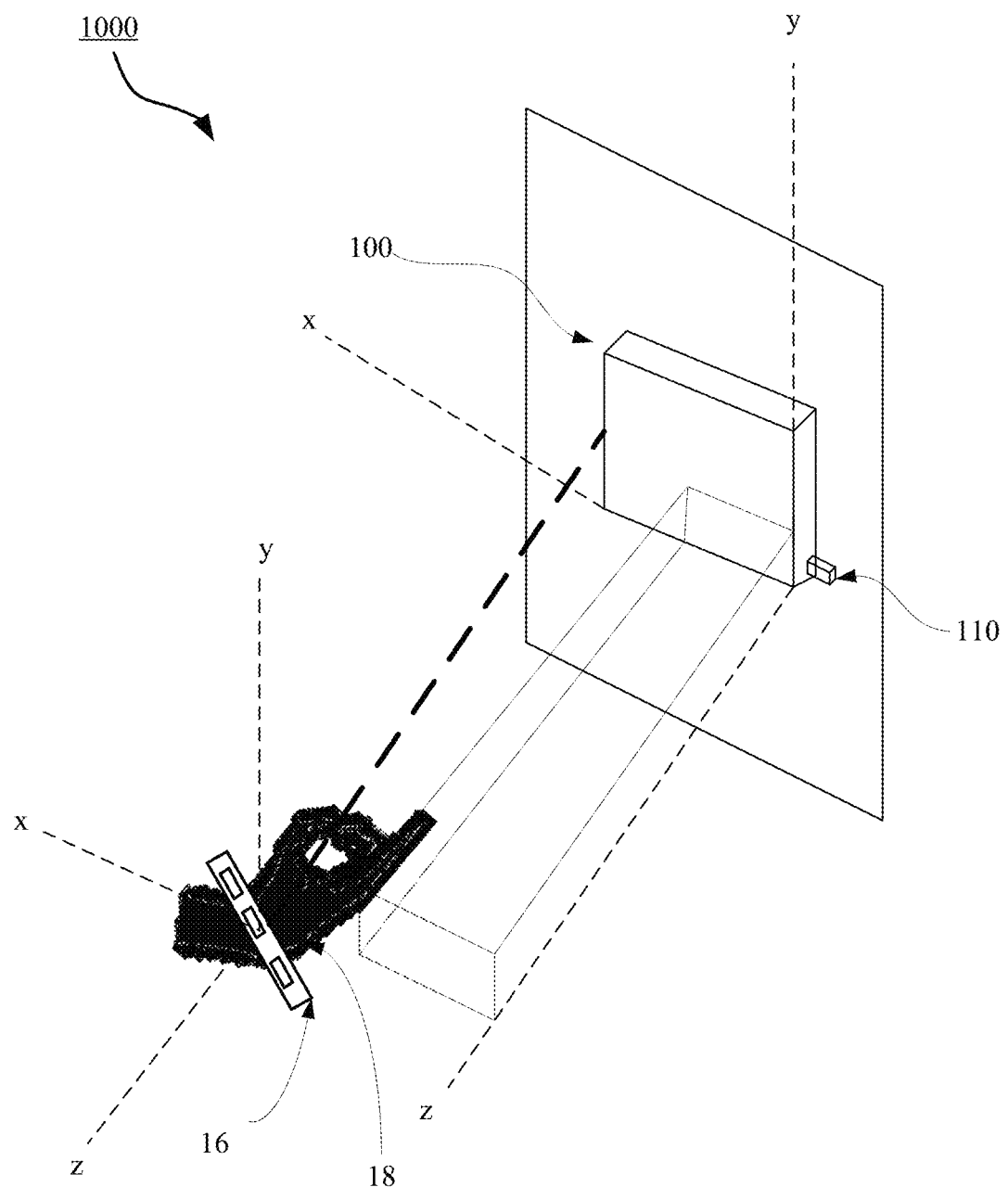
FIG. 10 illustrates an example tracking of a wrist of a user according to an embodiment.

Turning now to FIG. 8, a scenario 800 is shown in which the tracking of the wearable device 84 is illustrated. First, an orientation of the wearable device 84 is made based on IMM calculations. As discussed above, the IMM may utilize three-dimensional accelerometer and gyroscope technology to determine the orientation of the wearable device 84. The IMM of the wearable device 84 may also detect the arm and fingers of the user, and determine whether the arm and fingers of the user are parallel to the x-, y-, and z axis. An assumption is then made that the BT chip 82 is connected to the origin (0,0) of the screen 80. The wearable may then be tracked based on the expanded cuboids illustrated in scenario 900 of FIGS. 9A-9D.

In FIG. 9A, "D", the diagonal of the cuboid, is known. "D" is the distance between the BT chip 90 on the screen and the wearable, which is calculated as discussed above. Angles "alpha" and "beta" may also be known. Angle "alpha" is the horizontal Angle of Arrival, and angle "beta" is the vertical Angle of Arrival. The length (l), breath (b), and height (h) of the cuboid are unknown, and may be determined based on the following equations:

$$\frac{l}{\sin(\alpha^1)} = \frac{b}{\sin(\alpha)} = \frac{b}{\sin(90)}$$

$$\frac{l}{\sin(\beta^1)} = \frac{h}{\sin(\beta)} = \frac{e}{\sin(90)}$$

$$h^2 + c^2 = D^2,$$

Where:

$$\sin(90^0) = 1;$$

$$\alpha^1 = 90 - \alpha;$$

$$\beta^1 = 90 - \beta, \text{ and}$$

$$\sin(90^0 - x) = \cos(x).$$

$$l = \frac{D\cos(\alpha)\cos(\beta)}{\sqrt{1 - \sin^2(\alpha)\sin^2(\beta)}}$$

$$b = \frac{D\sin(\alpha)\cos(\beta)}{\sqrt{1 - \sin^2(\alpha)\sin^2(\beta)}}$$

$$h = \frac{D\sin(\beta)\cos(\alpha)}{\sqrt{1 - \sin^2(\alpha)\sin^2(\beta)}}$$

Figure 11A:
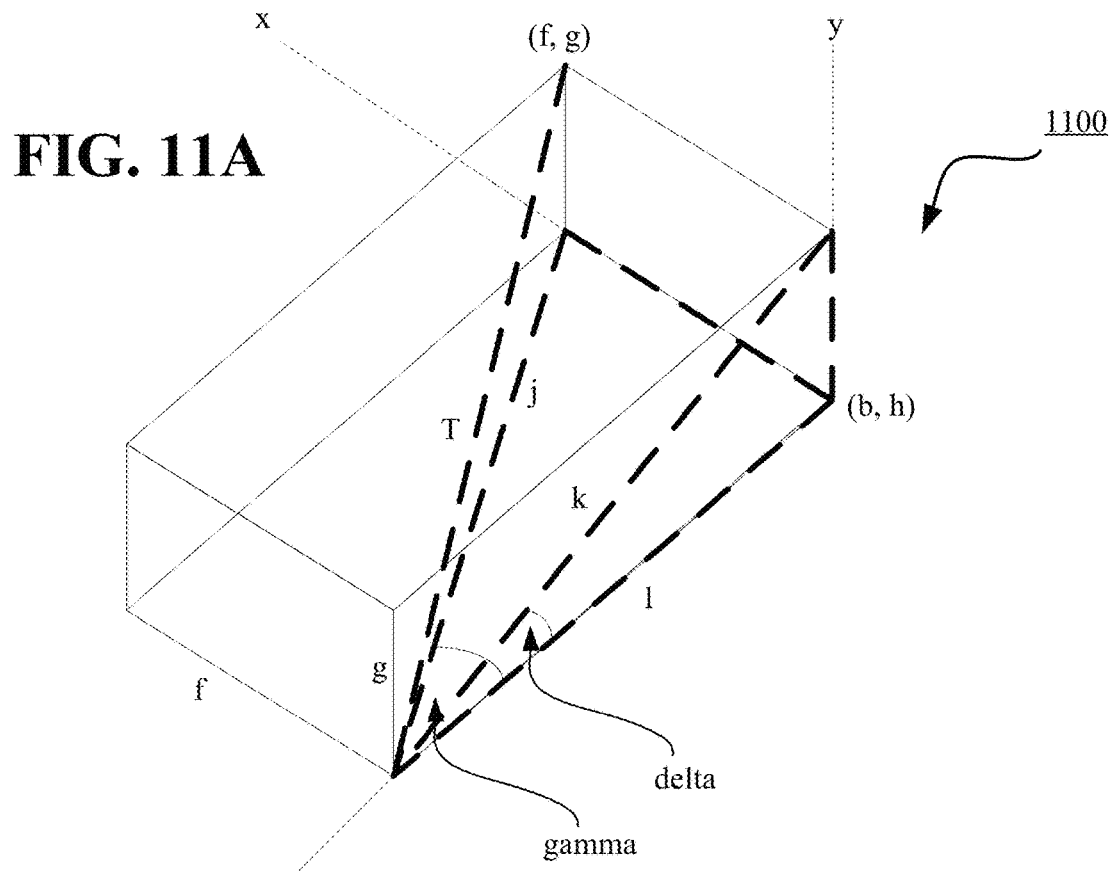
FIGS. 11A-11C illustrate a cuboid representation of an example tracking of a wrist of a user according to an embodiment.
Figure 11B:
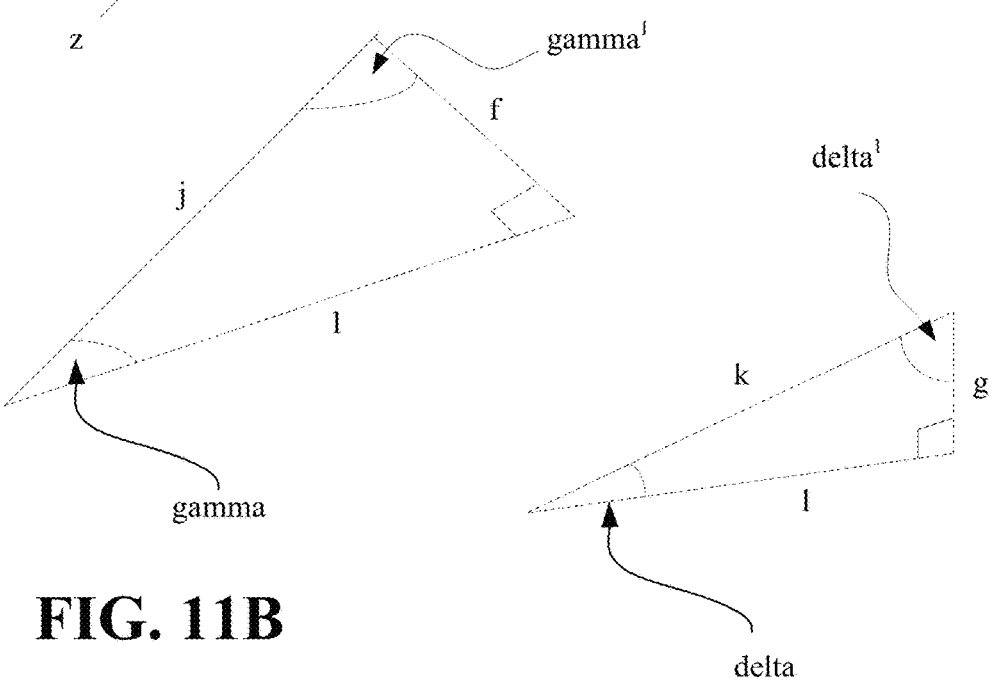
Figure 11C:
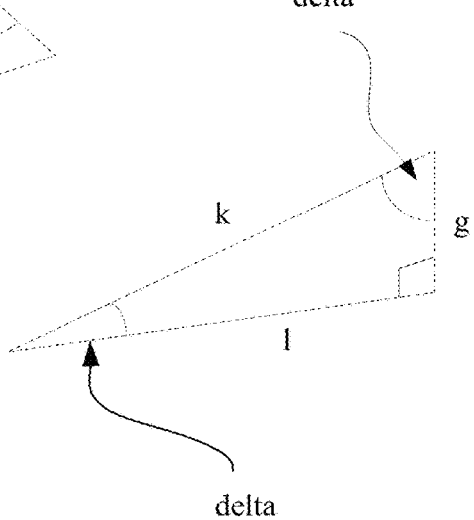

Turning now to FIGS. 10 and 11A to 11C, a scenario 1000 is shown in which the tracking of the wrist 18 of a user is illustrated. In FIGS. 11A to 11C, a determination is made whether the hand or arm is parallel to the x, y, and z axis. The length (l), which is the distance between the BT chip on the screen and the wearable, is known. Additionally, gamma, which is the tilt of the arm with respect to the x axis determined by the IMM on the wearable device 16, and delta, which is the tilt of the arm with respect to the y axis also determined by the IMM on the wearable device 16 are known. The unknown values are f and g, which are respectively the breadth and height of the cuboid, and may be calculated based on the following equations:

$$\frac{l}{\sin(\gamma^1)} = \frac{f}{\sin(\gamma)} = \frac{j}{\sin(90)}$$

-continued $$\frac{l}{\sin(\delta^1)} = \frac{g}{\sin(\delta)} = \frac{k}{\sin(90)}$$

Where:

$$\text{Sin}(90^0) = 1$$

$$\gamma^1 = 90 - \gamma$$

$$\delta^1 = 90 - \delta$$

$$\text{Sin}(90^0 - x) = \cos(x)$$

$$f = l\tan(\gamma)$$

$$g = l\tan(\delta).$$

Based on the equations discussed above, the final position (x) of the pointer 14 on the screen 12 (FIG. 1) from the origin (assuming the position of the BT on the screen is at the position (0,0), and the wrist and fingers of the user are oriented in a straight manner) is b+f and the final position (y) on the screen (assuming the position of the BT on the screen is at the position (0,0), and the wrist and fingers of the user are oriented in a straight manner) is h+g. The origin may be shifted to the actual position of the BT chip (90, FIG. 9A) on the screen.

According to an embodiment, various user operations may be performed on the screen by the user maintaining the fingers and thumb in a predetermined position for a predetermined period of time. For example, a "single click" operation may be performed if the fingers of the user are kept in the same position for a predetermined period of time. A "double click" operation may be performed if the fingers of the user are kept in the same position for a predetermined period of time greater than the time allocated for the Single Click operation.

Additionally, when an object on the screen 12 (FIG. 1) has been selected, the color of the pointer may change to confirm that the object has been selected.

Figure 12:
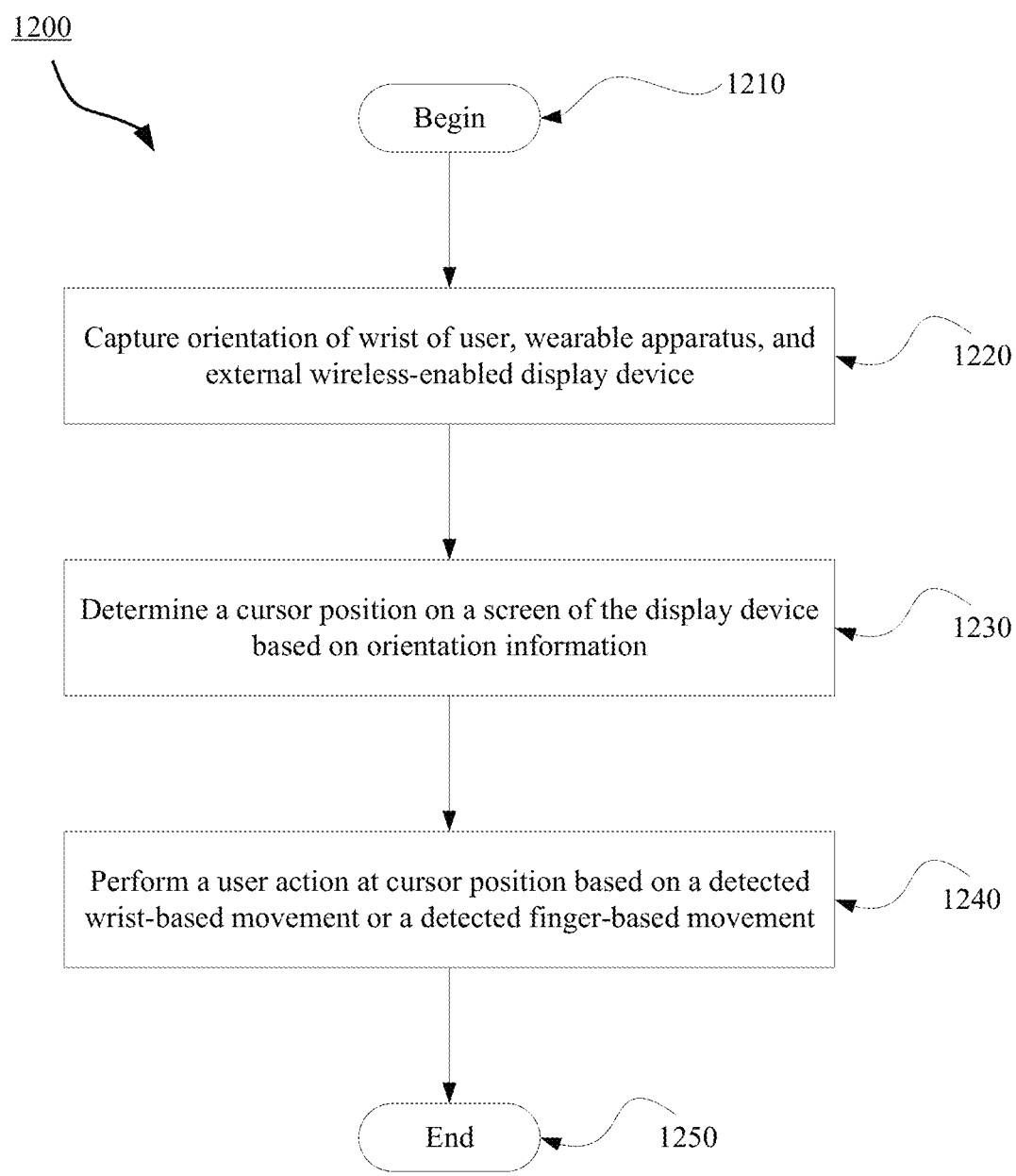
FIG. 12 illustrates a flowchart of a method of determining the position of a cursor on a display screen according to an embodiment.

FIG. 12 shows a method 1200 of determining an exact position of a cursor on a remote display screen. The method 1200 may generally be implemented in a computing device such as, for example, the wearable device 16 (FIG. 1), already discussed. More particularly, the method 1200 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 1200 may be written in any combination of one or more programming languages, including an object oriented programming language such as JAVA, SMALLTALK, C++ or the like and conventional procedural programming languages, such as the "C" programming language or similar programming languages.

Illustrated processing block 1220 may provide for capturing an orientation of a wrist 18 (FIG. 1) of the user and an orientation of the screen 12 (FIG. 1) of an external display device 10 (FIG. 1). As discussed above, the orientation of the wrist 18 (FIG. 1) of the user, and the orientation of the screen 12 (FIG. 1) of an external display device 10 (FIG. 1) may be obtained on the basis of calculations carried out by the IMM 210 (FIG. 2) of the wearable device 16 (FIG. 1).

At illustrated processing block 1230, a position of a cursor 14 (FIG. 1) may be determined based on the determined orientation of a wrist 18 (FIG. 1) of the user and the determined orientation of the screen 12 (FIG. 1) of an external display device 10 (FIG. 1).

At illustrated processing block 1240, a user action may be performed at the determined cursor position based on a detected wrist-based movement or a detected finger-based movement.

Although the method, apparatus, and system of the exemplary embodiments may determine the position of a screen pointer or cursor on a remote display screen based on wireless Angle of Arrival calculations, the exemplary embodiments may also apply to Bluetooth Special Interest Group (SIG) Angle of Departure (AoD) specifications.

Additional Notes and Examples:

Example 1 may include a system to determine a cursor position on a remote display screen, the system comprising a wireless-enabled display device; a wearable apparatus; a gesture monitor to detect one or more of a wrist of a user and a finger-based movement of the user; an inertial measurement monitor (IMM) to capture an orientation of the wrist of the user, an orientation of the wearable apparatus and an orientation of the external wireless-enabled display device; a wireless interface to transmit orientation information between the wearable apparatus and the external wireless-enabled display device, and a processor including logic to determine a cursor position on a screen of the display device based on the orientation information, and perform a user action based one or more of the detected wrist-based movement and the detected finger-based movement.

Example 2 may include the system of example 1 wherein the wrist-based orientation is calculated based on one or more of a distance between the wrist of the user and a wireless chip of the display device, and an angle of orientation between the wrist of the user and the wireless chip of the display device.

Example 3 may include the system of example 2, wherein the IMM is to determine the angle between the wrist of the user and the wireless chip of the display device based on an angle of arrival of radio frequency (RF) signals between the apparatus and the display device.

Example 4 may include the system of example 1, wherein the gesture monitor comprises one or more of a camera and a sensor.

Example 5 may include the system of example 4, wherein one or more of the wrist-based orientation and the finger-based movement is to be detected based on a signal from one or more of the camera and the sensor.

Example 6 may include the system of any one of examples 1 to 5, wherein the IMM is to determine an orientation of fingers of the user with respect to the apparatus.

Example 7 may include a wearable apparatus to determine a cursor position on a remote display screen, the wearable apparatus comprising: a gesture monitor to detect one or more of a wrist-based movement of a user or a finger-based movement of the user; an inertial measurement monitor (IMM) to capture an orientation of the wrist of the user, an orientation of the wearable apparatus and an orientation of an external wireless-enabled display device; a wireless interface to transmit orientation information between the wearable apparatus and the external wireless-enabled display device, and a processor including logic to determine a cursor position on a screen of the wireless-enabled display device based on the orientation information, and perform a user action based one or more of the detected wrist-based movement or the detected finger-based movement.

Example 8 may include the apparatus of example 7, wherein the orientation of the wrist is calculated based on one or more of a distance between the wrist of the user and a wireless chip of the display device, or an angle of orientation between the wrist of the user and the wireless chip of the display device.

Example 9 may include the apparatus of example 8, wherein the IMM is to determine the angle of orientation between the wrist of the user and the wireless chip of the display device based on an angle of arrival of radio frequency (RF) signals between the apparatus and the display device.

Example 10 may include the apparatus of example 7, wherein the gesture monitor comprises one or more of a camera or a sensor.

Example 11 may include the apparatus of example 10, wherein one or more of the orientation of the wrist or the finger-based movement is to be detected based on a signal from one or more of the camera or the sensor.

Example 12 may include the apparatus of any one of examples 7 to 11, wherein the IMM is to determine an orientation of fingers of the user with respect to the apparatus.

Example 13 may include a method to determine a cursor position on a remote display screen, the method comprising: capturing an orientation of a wrist of a user, an orientation of a wearable apparatus and an orientation of an external wireless-enabled display device; determining a cursor position on a screen of the display device based on orientation information related to an orientation of a wrist of a user, an orientation of a wearable apparatus and an orientation of an external wireless-enabled display device, and performing a user action based one or more of the detected wrist-based movement and the detected finger-based movement.

Example 14 may include the method of example 13, further comprising calculating the wrist-based orientation based on one or more of a distance between the wrist of the user and a wireless chip of the display device, and an angle of orientation between the wrist of the user and the wireless chip of the display device.

Example 15 may include the method of example 14, further comprising determining the angle between the wrist of the user and the wireless chip of the display device based on an angle of arrival of radio frequency (RF) signals between the apparatus and the display device.

Example 16 may include the method of example 13, further comprising detecting one or more of the wrist of the user and the finger-based movement of the user using one or more of a camera and a sensor.

Example 17 may include the method of example 16, further comprising detecting one or more of the wrist-based orientation and the finger-based movement based on a signal from one or more of the camera and the sensor.

Example 18 may include the method of any one of examples 13 to 17, further comprising determining an orientation of fingers of the user with respect to the apparatus.

Example 19 may include at least one computer readable storage medium comprising a set of instructions, which when executed by an apparatus, cause a wearable apparatus to: detect one or more of a wrist of a user and a finger-based movement of the user; capture an orientation of the wrist of the user, an orientation of a wearable apparatus and an orientation of an external wireless-enabled display device;

transmit orientation information between the wearable apparatus and the external wireless-enabled display device, and determine a cursor position on a screen of the display device based on the orientation information, and performing a user action based one or more of the detected wrist-based movement and the detected finger-based movement.

Example 20 may include the at least one computer readable storage medium of example 19, wherein the instructions, when executed, cause the apparatus to calculate the wrist-based orientation based on one or more of a distance between the wrist of the user and a wireless chip of the display device, and an angle of orientation between the wrist of the user and the wireless chip of the display device.

Example 21 may include the at least one computer readable storage medium of example 20, further comprising determining the angle between the wrist of the user and the wireless chip of the display device based on an angle of arrival of radio frequency (RF) signals between the apparatus and the display device.

Example 22 may include the at least one computer readable storage medium of example 19, wherein the instructions, when executed, cause the apparatus to detect one or more of the wrist of the user and the finger-based movement of the user using one or more of a camera and a sensor.

Example 23 may include the at least one computer readable storage medium of example 22, further comprising detecting one or more of the wrist-based orientation and the finger-based movement based on a signal from one or more of the camera and the sensor.

Example 24 may include the at least one computer readable storage medium of any one of examples 19 to 23, further comprising determining an orientation of fingers of the user with respect to the apparatus.

Example 25 may include a wearable apparatus to determine a cursor position on a remote display screen, the wearable apparatus comprising: means for capturing an orientation of a wrist of a user, an orientation of a wearable apparatus and an orientation of an external wireless-enabled display device; means for determining a cursor position on a screen of the display device based on orientation information related to an orientation of a wrist of a user, an orientation of a wearable apparatus and an orientation of an external wireless-enabled display device, and means for performing a user action based one or more of the detected wrist-based movement and the detected finger-based movement.

Example 26 may include the apparatus of example 25, further comprising calculating the wrist-based orientation based on one or more of a distance between the wrist of the user and a wireless chip of the display device, and an angle of orientation between the wrist of the user and the wireless chip of the display device.

Example 27 may include the apparatus of example 26, further comprising determining the angle between the wrist of the user and the wireless chip of the display device based on an angle of arrival of radio frequency (RF) signals between the apparatus and the display device.

Example 28 may include the apparatus of example 25, further comprising detecting one or more of the wrist of the user and the finger-based movement of the user using one or more of a camera and a sensor.

Example 29 may include the apparatus of example 28, further comprising detecting one or more of the wrist-based orientation and the finger-based movement based on a signal from one or more of the camera and the sensor.

Example 30 may include the apparatus of any one of examples 25 to 29, further comprising determining an orientation of fingers of the user with respect to the apparatus.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A system comprising:
  a wireless-enabled display device;
  a wearable apparatus;
  a gesture monitor to detect a wrist-based movement of a user and/or a finger-based movement of the user;
  an inertial measurement monitor (IMM) to capture an orientation of a wrist of the user, an orientation of the wearable apparatus and an orientation of the external wireless-enabled display device;
  a wireless interface to transmit orientation information between the wearable apparatus and the external wireless-enabled display device, and a processor including logic to determine a cursor position on a screen of the display device based on the orientation information, and perform a user action based on the detected wrist-based movement and/or the detected finger-based movement,
  wherein the orientation of the wrist is calculated based on a distance between the wrist of the user and a wireless chip of the display device and an angle of orientation between the wrist of the user and the wireless chip of the display device.

2. The system of claim 1, wherein the IMM determines the angle between the wrist of the user and the wireless chip of the display device based on an angle of arrival of radio frequency (RF) signals between the apparatus and the display device.

3. The system of claim 1, wherein the gesture monitor comprises one or more of a camera and a sensor.

4. The system of claim 3, wherein the orientation of the wrist and/or the finger-based movement is to be detected based on a signal from the camera and/or the sensor.

5. The system of claim 1, wherein the IMM is to determine an orientation of fingers of the user with respect to the apparatus.

6. A wearable apparatus comprising:
  a gesture monitor to detect a wrist-based movement of a user and/or a finger-based movement of the user;
  an inertial measurement monitor (IMM) to capture an orientation of the wrist of the user, an orientation of the wearable apparatus and an orientation of an external wireless-enabled display device;
  a wireless interface to transmit orientation information between the wearable apparatus and the external wireless-enabled display device, and a processor including logic to determine a cursor position on a screen of the wireless-enabled display device based on the orientation information, and perform a user action based on the detected wrist-based movement and/or the detected finger-based movement,
  wherein the orientation of the wrist is calculated based on a distance between the wrist of the user and a wireless chip of the display device and an angle of orientation between the wrist of the user and the wireless chip of the display device.

7. The apparatus of claim 6, wherein the IMM determines the angle of orientation between the wrist of the user and the wireless chip of the display device based on an angle of arrival of radio frequency (RF) signals between the apparatus and the display device.

8. The apparatus of claim 6, wherein the gesture monitor comprises a camera and/or a sensor.

9. The apparatus of claim 8, wherein the orientation of the wrist and/or the finger-based movement is to be detected based on a signal from the camera and/or the sensor.

10. The apparatus of claim 6, wherein the IMM is to determine an orientation of fingers of the user with respect to the apparatus.

11. A method comprising:
  capturing an orientation of a wrist of a user, an orientation of a wearable apparatus and an orientation of an external wireless-enabled display device;
  determining a cursor position on a screen of the display device based on orientation information related to an orientation of a wrist of a user, an orientation of a wearable apparatus and an orientation of an external wireless-enabled display device,
  performing a user action based on a detected wrist-based movement and/or a detected finger-based movement, and
  calculating the orientation of the wrist based on a distance between the wrist of the user and a wireless chip of the display device and an angle of orientation between the wrist of the user and the wireless chip of the display device.

12. The method of claim 11, further comprising determining the angle between the wrist of the user and the wireless chip of the display device based on an angle of arrival of radio frequency (RF) signals between the apparatus and the display device.

13. The method of claim 11, further comprising detecting the wrist-based movement of the user and/or the finger-based movement of the user using a camera and/or a sensor.

14. The method of claim 13, further comprising detecting the orientation of the wrist and/or the finger-based movement based on a signal from the camera and/or the sensor.

15. The method of claim 11, further comprising determining an orientation of fingers of the user with respect to the apparatus.

16. At least one non-transitory computer readable storage medium comprising a set of instructions, which when executed by an apparatus, cause a wearable apparatus to:
  detect a wrist-based movement of a user and/or a finger-based movement of the user;
  capture an orientation of the wrist of the user, an orientation of a wearable apparatus and an orientation of an external wireless-enabled display device;
  transmit orientation information between the wearable apparatus and the external wireless-enabled display device,
  determine a cursor position on a screen of the display device based on the orientation information, and performing a user action based on the detected wrist-based movement and/or the detected finger-based movement, and
  calculate the orientation of the wrist based on a distance between the wrist of the user and a wireless chip of the display device and an angle of orientation between the wrist of the user and the wireless chip of the display device.

17. The at least one non-transitory computer readable storage medium of claim 16, further comprising determining the angle between the wrist of the user and the wireless chip of the display device based on an angle of arrival of radio frequency (RF) signals between the apparatus and the display device.

18. The at least one non-transitory computer readable storage medium of claim 16, wherein the instructions, when executed, cause the apparatus to detect the wrist-based movement of the user and/or the finger-based movement of the user using a camera and/or a sensor.

19. The at least one non-transitory computer readable storage medium of claim 18, further comprising detecting the orientation of the wrist and/or the finger-based movement based on a signal from the camera and/or the sensor.

20. The at least one non-transitory computer readable storage medium of claim 16, further comprising determining an orientation of fingers of the user with respect to the apparatus.

* * * * *